United States Patent [19]

Janson

[11] Patent Number: 4,515,031
[45] Date of Patent: May 7, 1985

[54] CHAIN DRIVEN REVERSE GEAR FOR A MANUAL TRANSMISSION

[75] Inventor: David A. Janson, Plymouth, Mich.

[73] Assignee: Ford Motor Company, Dearborn, Mich.

[21] Appl. No.: 425,826

[22] Filed: Sep. 28, 1982

[51] Int. Cl.³ .................... F16H 3/08; F16H 3/38; F16H 3/14
[52] U.S. Cl. .................... 74/359; 74/339; 74/375; 74/376
[58] Field of Search ............ 74/359, 360, 361, 376, 74/339, 363, 375, 745

[56] References Cited

U.S. PATENT DOCUMENTS

| | | | |
|---|---|---|---|
| 1,370,947 | 3/1921 | Budd | 74/376 |
| 1,442,057 | 1/1923 | Eggert | 74/376 |
| 2,039,665 | 5/1936 | Rossetter | 74/376 |
| 2,185,537 | 1/1940 | Brownlee | 74/376 |
| 2,314,549 | 3/1943 | Milbrath | 74/376 |
| 2,480,938 | 9/1949 | Lapsley | 74/361 X |
| 2,764,041 | 9/1956 | Walker et al. | 74/376 X |
| 3,618,416 | 11/1971 | Longshore | 74/375 X |
| 4,222,281 | 9/1980 | Mylenek | 74/339 |
| 4,228,693 | 10/1980 | Kelbel | 74/339 |
| 4,307,624 | 12/1981 | Mylenek | 74/477 |
| 4,337,675 | 7/1982 | Holdeman | 74/477 |

Primary Examiner—Allan D. Herrmann
Assistant Examiner—Stephen B. Andrews
Attorney, Agent, or Firm—Frank G. McKenzie; Donald J. Harrington

[57] ABSTRACT

A fifth forward speed pinion is mounted by a bearing on the end of a countershaft that provides a space into which the bearing is fitted. A roller bearing mounted in the transmission casing supports the fifth speed pinion at the opposite end from that of the countershaft. The countershaft carries a reverse drive sprocket that is selectively connected to the countershaft by movement of a synchronizer clutch in accordance with control exercised by the vehicle operator. A reverse driven sprocket is drivably connected to the output shaft and torque is transmitted between the sprockets by a flexible, endless chain or belt.

7 Claims, 5 Drawing Figures

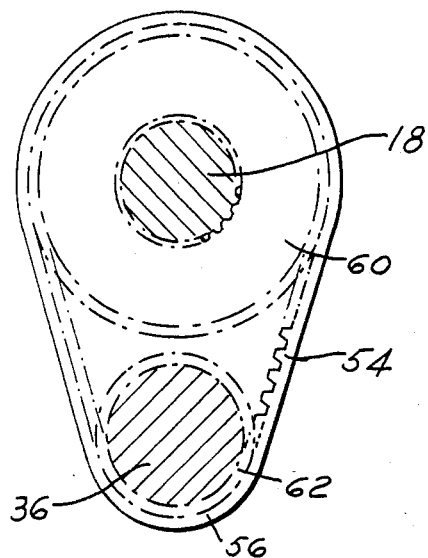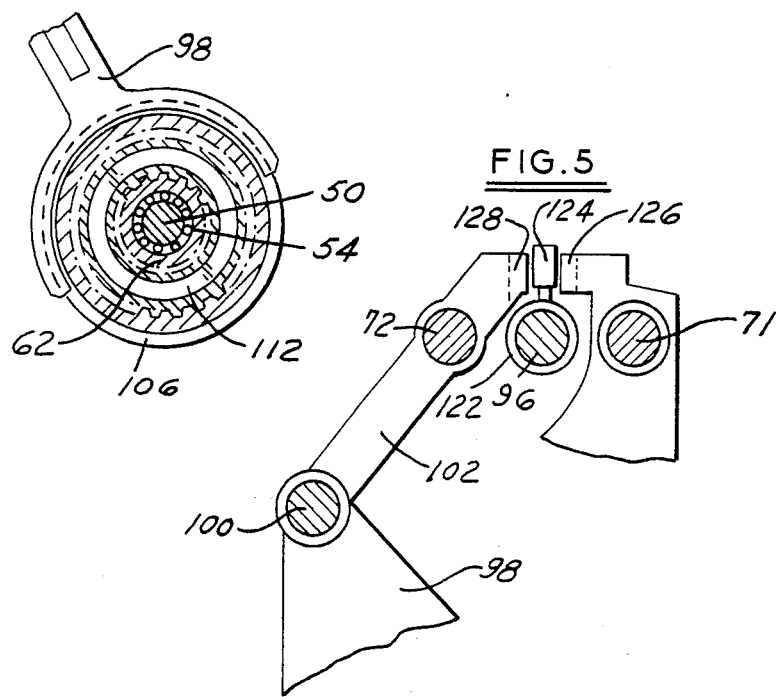

CHAIN DRIVEN REVERSE GEAR FOR A MANUAL TRANSMISSION

BACKGROUND OF THE INVENTION

1. Field of the Invention

The present invention relates to manual transmissions for automotive use able to produce multiple forward drive ratios, the number of the ratios being determined by the configuration of the gear arrangement. More particularly, this invention pertains to a manual automotive transmission in which reverse drive is produced by an endless, flexible chain or belt that transmits power between an output shaft and a countershaft without the use of a reverse idler gear and its associated shift mechanism.

2. Description of the Prior Art

Transmissions that provide five forward speed ratios and a reverse drive ratio generally have three cross-over positions for the shift selector shaft. Each cross-over position selects an appropriate shift fork, which may be moved in opposite longitudinal directions to engage two gear ratios. The first cross-over position selects the first and second forward speed ratios, the second selects the third and fourth speed ratios and the third selects the fifth forward and reverse speed ratios. The presence of the fifth forward speed ratio requires that the countershaft be extended in length from that required in transmissions having only four forward drive ratios in order to carry the additional fifth speed pinion and often the fifth speed synchronizer clutch as well. U.S. Pat. Nos. 4,337,675 and 4,228,693 describe examples of five speed ratio manual transmissions that require longer countershafts than that required for the four forward speed version of the transmissions. Similarly, the output shafts for the transmissions disclosed in these patents require means to fix the fifth speed output gear and the fifth speed synchronizer clutch on the output shaft. U.S. Pat. No. 4,222,281 describes a four-speed ratio transmission whose countershaft has been extended and whose shift mechanism has been modified to accommodate the five speed ratio form of the transmission disclosed in U.S. Pat. No. 4,307,624.

Manual transmissions generally require a reverse idler gear that is moved along the axis of its supporting shaft into meshing engagement with a reverse drive pinion and a reverse output gear through the action of the shift mechanism whose motion is controlled by the vehicle operator. Generally reverse drive is produced by a shift mechanism which includes a reverse motion bell crank that transmits shifting motion of a shift selector shaft to the reverse idler in a direction that is opposite from that applied to the shift selector shaft. This reverse motion mechanism is required in order to maintain the conventional shifting pattern through which the shift selector shaft is moved where the reverse idler must be moved in a direction opposite to that produced by the standard direction of the gear selector. Where the reverse motion mechanism and reverse idler gear are required, the transmission casing must have an enlarged space to accommodate the additional parts required, particularly for the reverse idler and its supporting shaft. The reverse shift mechanism of this type requires necessarily a greater number of parts than would be required if the reverse idler were absent or if the reverse motion mechanism were not necessary. Furthermore, if the need to move the reverse idler on its supporting shaft were eliminated, the number of shift mechanism parts, the complexity of the mechanism, the weight and the overall cost would be appreciably less than that of conventional transmissions.

SUMMARY OF THE INVENTION

In a manual transmission that can be adapted to produce either four or five forward speed ratios depending upon the option selected by the manufacturer or vehicle owner, a greater number of parts common to both versions is possible if the same countershaft and output shaft were used to produce either of these options. This advantage is realized in the manual transmission according to this invention by providing a fifth forward speed pinion that can be mounted on a bearing fitted within a space provided on the countershaft, which is suitable for use in the four or five speed version of the transmission. A second bearing supported on the transmission casing provides additional support to the fifth speed pinion. The output shaft can be readily modified for the fifth forward speed output gear by providing a splined surface with which the output gear can be selectively connected. A synchronizer clutch, adapted to connect the fifth speed pinion and the reverse pinion to the countershaft, is moved axially along the shaft in opposite directions to produce these engagements. A flexible, endless chain or belt continuously engages the teeth of a reverse drive sprocket journalled on the countershaft and a reverse driven sprocket fixed to the output shaft. Reverse drive is produced when the synchronizer clutch is moved forward to connect the reverse drive sprocket to the countershaft, which is turned by a pair of mating gears in the opposite direction from that of the engine crankshaft, the chain drive turning the output shaft in the same direction as the countershaft.

The reverse drive of the torque delivery path according to this invention eliminates the need for the conventional reverse idler gear, its supporting stub shaft, provision for support of the stub shaft on the transmission casing and the need for a reverse motion shift mechanism usually required to produce the conventional shifting pattern among the forward and reverse gear ratios. The chain or belt-driven sprockets, used to produce the reverse drive ratio are available at lower cost than the three gears that are normally part of the reverse drive gearset.

BRIEF DESCRIPTION OF THE DRAWING

FIG. 2 is a cross section taken at plane II—II of FIG. 1.

FIG. 3 is a cross section taken at plane III—III of FIG. 1.

FIG. 5 is a partial side elevation view of the shift mechanism shown in FIGS. 1 and 4.

DESCRIPTION OF THE PREFERRED EMBODIMENT

Figure 1:
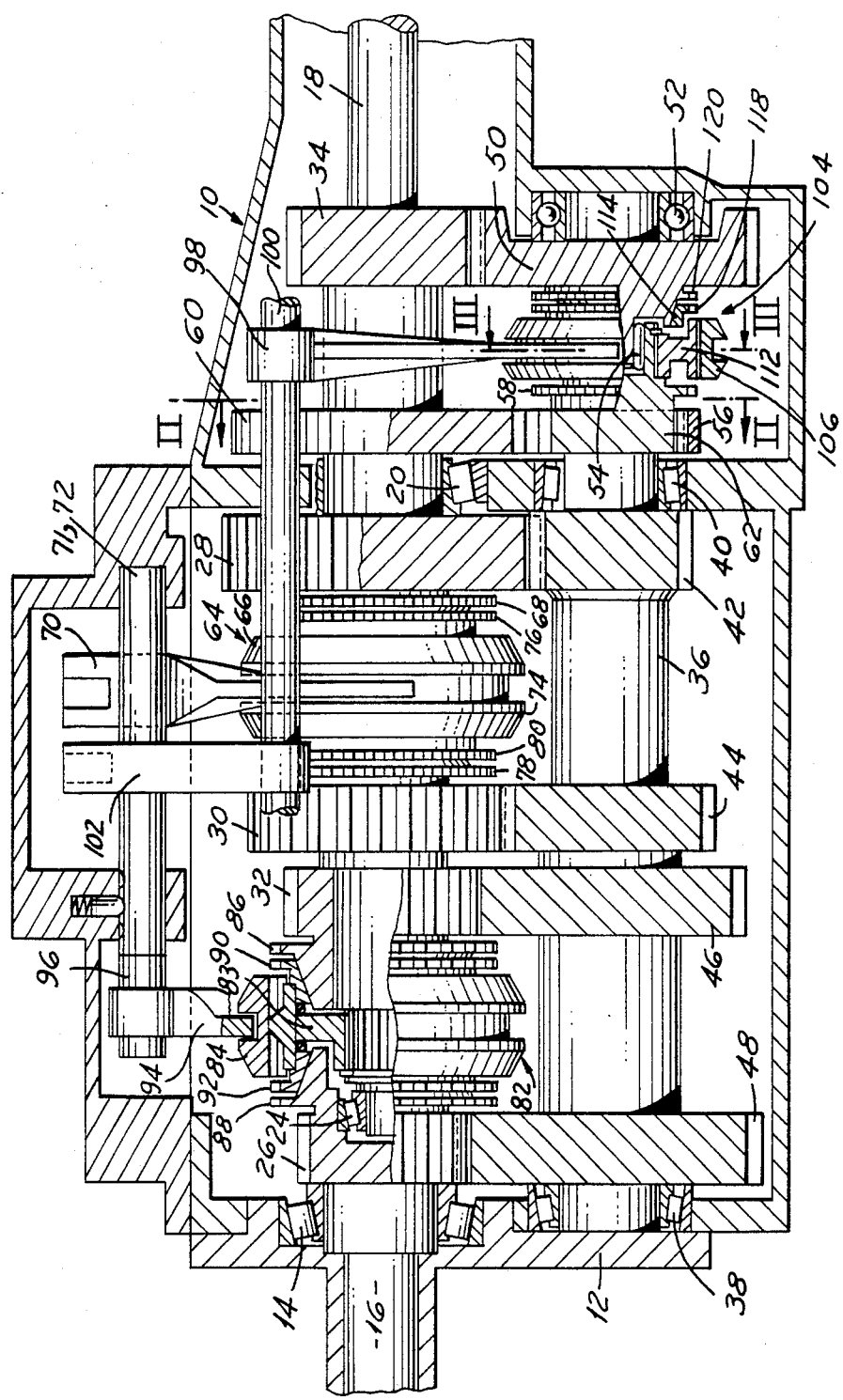
FIG. 1 is a side elevation view, partially in cross section taken at a plane passing through the output shaft and the countershaft of a manual transmission according to the present invention.

Turning first to FIG. 1 for a more detailed description of the invention, a transmission housing 10 containing torque transmitting and gear ratio selection elements has a forward wall 12 which receives the front bearing 14, upon which the torque input shaft 16 is supported. Shaft 16 is connected to the friction clutch disk of a selectively engageable friction clutch (not shown) through which torque is delivered from the engine. A power output shaft 18 is supported at its forward end in bearing 24 located in the opening formed in the torque input gear 26 which is formed as an integral part of input shaft 16. Output shaft 18 has journalled on its surface a low speed ratio gear 28, a second speed gear 30, and a third speed gear 32.

A countershaft or layshaft 36 has its forward end supported in a bearing 38 and its rearward end in bearing 40. Formed integrally with or secured to countershaft 36 are four output gears shown respectively at 42, 44, 46 and 48. These form a portion of the torque delivery paths for operation in the in low speed ratio, second speed ratio, third speed ratio and fifth speed ratio and reverse drive. These pinions are in continuous meshing engagement with gears 28, 30, 32 and 26, respectively.

A fifth drive ratio pinion 50 is supported partially on the transmission housing by way of bearing 52 and partially by bearing 54 that is located within a recess or pocket formed at the rearward end of countershaft 36. Fifth speed pinion 50 is in continuous meshing engagement with fifth speed output gear 34, which is fixed by a spline to or integrally formed with the output shaft 18.

A reverse drive sprocket 62 is journalled on the outer surface of countershaft 36 and provides a set of dog teeth 58. A reverse driven sprocket 60 is splined to the output shaft and aligned axially with reverse drive sprocket 62. The sprockets 60, 62 each have teeth formed on their circumference that are engaged by the links of a flexible, endless chain belt 56.

A one-two synchronizer 64 has a clutch sleeve 66 formed with internal clutch teeth that are adapted to engage external dog teeth 68 formed on the first speed gear 28. A one-two shift fork 70 fixed to a shift rail 71 engages the recess formed on the outer surface of sleeve 66 whereby the sleeve is moved forward and rearward as the shift selector is moved by the vehicle operator. Blocker ring teeth 76 and the blocker ring on which they are formed synchronize the speed of shaft 18 with that of gear 28 and prevent shifting motion of sleeve 66 into clutching engagement with dog teeth 68 at speeds other than the synchronous speed. When the speed of the output shaft is synchronous with that of gear 28, sleeve 66 is moved rearward to engage dog teeth 68 thereby connecting gear 28 to shaft 18 and establishing low speed ratio operation. When this is accomplished, torque is transmitted from input shaft 16 through main input gear 26 to the cluster gear or countershaft 36, the first speed ratio pinion 42, first speed output gear 28 and one-two synchronizer 64 to the output shaft 18.

Second gear 30 also is adapted to be selectively connected to output shaft 18 through the one-two synchronizer clutch mechanism 64. Gear 30 has a set of dog teeth 78 and carries a blocker ring upon which blocker ring teeth 80 are formed. Synchronizer 64 is actuated when sleeve 66 is shifted forward, thereby establishing a second underdrive speed ratio as gear 30 is connected to output shaft 18 by synchronizer sleeve 16 being moved into engagement with teeth 78 and 80. Synchronizer 64, in the conventional manner, has a hub member to which sleeve 66 is slidably fixed, the hub being splined to the outer surface of output shaft 18. In the second speed ratio position, torque is delivered to gear 30 from pinion 44 of the countershaft 36 with which it is in continuous meshing engagement, and from there to output shaft 18 to which gear 30 is drivably connected by synchronizer 64. When sleeve 66 is shifted to the neutral position, midway between the forward and rear positions, gears 28 and 30 are disconnected from output shaft 18.

A three-four synchronizer clutch mechanism 82 includes a synchronizer hub 83, which is splined to the outer surface of output shaft 18, and synchronizer clutch sleeve 84, which has internal teeth adapted to register with external dog teeth 86, 88 formed respectively on third gear 32 and input gear 26. Blocker rings supported on a conical surface of gears 32 and 26 have teeth 90, 92 formed on their circumferences, which teeth are engaged by the internal teeth of clutch sleeve 84 when it is moved forward and rearward by the three-four shift fork 94 due to motion applied to shift rail 96 by the vehicle operator. To condition synchronizer clutch 82 for third speed ratio operation, sleeve 66 is moved to the neutral position and sleeve 84 is moved rearward, whereby input torque is transmitted from shaft 16 through input gear 26, gear elements 48 and 46, third speed gear 32, sleeve 84 and through the hub 83 of synchronizer 82 to the output shaft 18. A shift to the fourth speed ratio is achieved by moving synchronizer sleeve 84 forward, thereby connecting input gear 26 directly to output shaft 18 by way of synchronizer mechanism 82.

Figure 4:
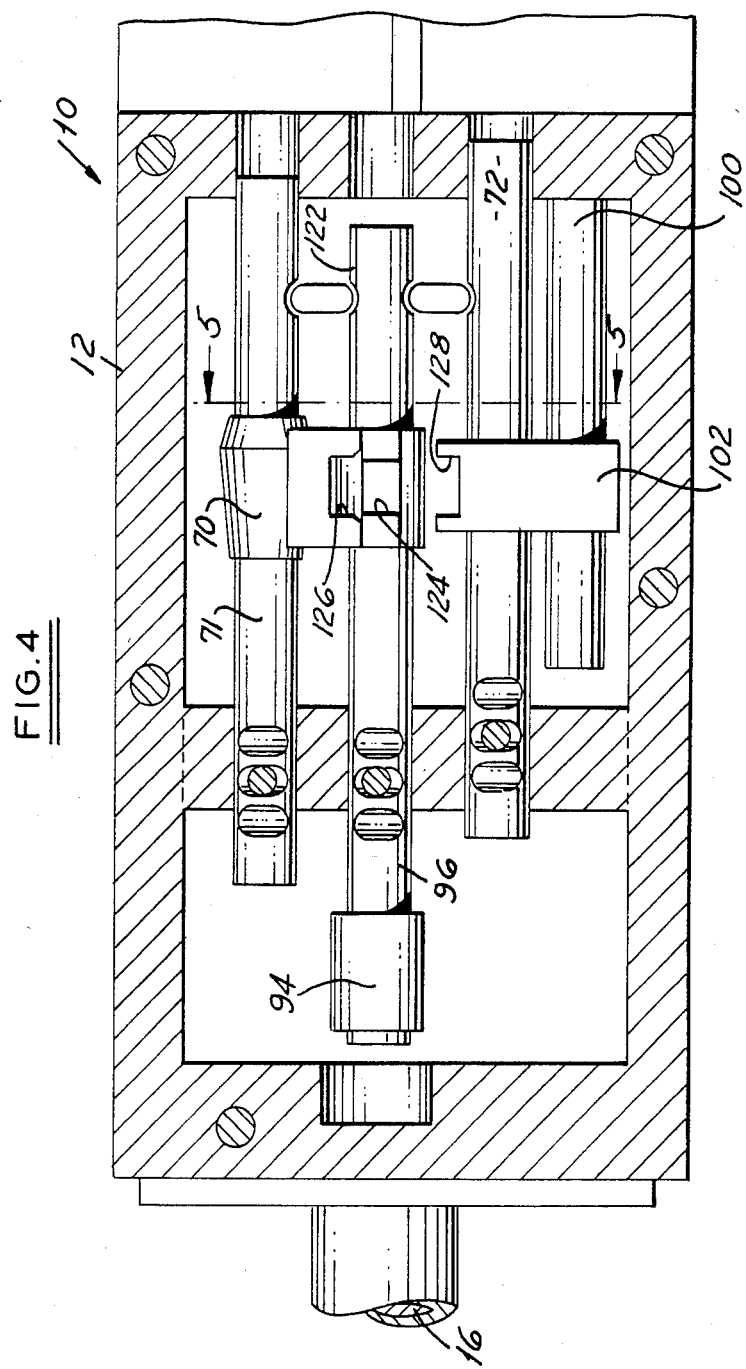
FIG. 4 a top view of the gear select mechanism of the transmission shown in FIG. 1.

Similarly, the fifth forward speed and reverse drive are effected by movement of a five-reverse shift fork 98 carried by shift rail 100 to which motion is transmitted when arm 102 is moved forward and rearward by shifting movement applied to the shift selector by the vehicle operator. It can be seen by comparing FIGS. 1 and 4 that arm 102 is located in FIG. 1 leftward of its true position which is shown in FIG. 4. This was done so that synchronizer 64 and fork 70 would not be obstructed as they would be if arm 102 were not relocated. Actually, the notches at the upper ends of fork 70, arm 102 and rail 96 are axially aligned when the shift mechanism is in the neutral position. The five-reverse synchronizer clutch mechanism 104 includes a clutch sleeve 106, which has internal teeth by means of which it is drivably connected to the hub 112 of the synchronizer, the hub being splined to the outer surface of countershaft 36. Blocker ring 114 is supported on a conical surface of gear 50, and has dog teeth 118 formed on its circumference. Similarly, fifth speed gear 50 has a set of dog teeth 120 formed on its circumference. Fifth speed ratio is produced when sleeve 106 is moved rearward into engagement with teeth 118 and 120, thereby drivably connecting gear 50 to countershaft 36 by way of sleeve 106 and the hub 112 of synchronizer 104. In the fifth speed ratio condition, torque is transmitted from input gear 26 to countershaft 36 by way of pinion 48 and through the operation of synchronizer 104 to gear 50 and to output shaft 18 by way of fifth gear 34, which is in mesh with pinion 50.

Reverse drive operation is produced when synchronizers 64 and 82 are in their neutral positions and the sleeve of synchronizer 104 is moved forward into engagement with teeth 58. Then sprocket wheel 62 is drivably connected to countershaft 36 through operation Having described a preferred embodiment of my invention, what I claim and desire to secure by U.S. Letters Patent is:

1. A multiple speed ratio manual transmission comprising:

an input shaft adapted to be clutched to the crankshaft of an internal combustion engine, the shaft having an input gear secured thereto;

a countershaft having a gear fixed thereto in meshing engagement with the input gear;

an output shaft;

gearing defining a torque delivery path that includes a pair of meshing gears, one gear carried by the output shaft and one gear supported, at least in part, on the countershaft;

a first sprocket wheel carried by the countershaft and a second sprocket wheel carried by the output shaft;

a flexible, endless drive belt or chain engaging the sprocket wheels;

coupler means including a first coupler for selectively connecting one gear of the meshing gear pair and one sprocket wheel to the shaft on which said gear and said sprocket wheel are supported; and a drive ratio selector mechanism having a first shift fork adapted to move the coupler means selectively into engagement with said gear and said sprocket wheel;

wherein the countershaft is rotatably mounted on bearings, a portion of the countershaft extending axially beyond the bearings, said extending portion providing a splined surface for supporting and connecting the coupler means to the shaft and providing means for at least partially rotatably supporting said gear of said meshing gear pair.

2. The transmission of claim 1 wherein the means for supporting the gear of the meshing gear pair includes a recess formed at the end of the extending portion of the countershaft having an open end facing said gear, a first stub shaft portion on said gear extending axially toward said recess, a first bearing located within said recess adapted to receive therein the first stub shaft portion of said gear, a second stub shaft portion on said first gear extending axially away from said recess, and a second bearing located adjacent said gear adapted to receive therein the second stub shaft portion.

3. The transmission of claim 2 wherein the second bearing is fitted within the casing of the transmission at the side of said gear that is axially opposite the first bearing.

4. The transmission of claim 1 wherein the gearing includes multiple torque delivery paths including multiple pairs of meshing gears and pinions, the gear of each gear-pinion pair carried by the output shaft, the pinion of each gear-pinion pair carried by the countershaft; the coupler means includes a second coupler for selectively connecting the gears of two gear-pinion pairs to the output shaft; the drive ratio selector mechanism further includes a second shift fork adapted to move the second coupler selectively into engagement with the gears of the two gear-pinion pairs; the first sprocket wheel is journalled on the countershaft; and the second sprocket wheel and the gear of the meshing gear pair are fixed to the output shaft.

5. The transmission of claim 4 wherein the means for supporting the pinion of a gear-pinion pair includes:

a recess formed at the end of the extending portion of the countershaft having an open end facing said pinion;

a first stub shaft portion on said pinion extending axially toward said recess;

a first bearing located within said recess adapted to receive therein the first stub shaft portion of said pinion;

a second stub shaft portion on said pinion extending axially away from said recess; and a second bearing located adjacent said pinion adapted to receive therein the second stub shaft portion.

6. The transmission of claim 4 wherein the second bearing is fitted within the casing of the transmission at the side of said pinion that is axially opposite the first bearing.

7. The transmission of claim 4 wherein the gears and pinions of first and second gear-pinion pairs form torque delivery paths for first and second forward speed ratios, respectively, the meshing gear pair form a torque delivery path for a third forward speed ratio and the sprocket wheels and drive belt form a torque delivery path for reverse drive, and wherein the first shift fork and second shift fork move axially in a first direction to cause the first coupler and second coupler to engage a gear of the meshing gear pair and the gear of the second gear-pinion pair, respectively, and the first shift fork and the second shift fork move axially in a second direction that is axially opposite the first direction to cause the first coupler and second coupler to engage the sprocket wheel that is carried by the countershaft and the gear of the first gear-pinion pair, respectively.

* * * * *